United States Patent
Hayashi et al.

[11] Patent Number: 6,021,665
[45] Date of Patent: Feb. 8, 2000

[54] CANTILEVER TRACKING TYPE SCANNING PROBE MICROSCOPE

[75] Inventors: Yoshiaki Hayashi, Ome; Shuichi Itoh, Sagamihara, both of Japan

[73] Assignee: Olympus Optical Co., Ltd., Tokyo, Japan

[21] Appl. No.: 09/120,209

[22] Filed: Jul. 21, 1998

[30] Foreign Application Priority Data

Jul. 24, 1997 [JP] Japan .................................. 9-198513
Jun. 25, 1998 [JP] Japan ................................ 10-178446

[51] Int. Cl.⁷ .................................................... G01B 7/34
[52] U.S. Cl. ............................................................ 73/105
[58] Field of Search ................................ 73/105; 250/306

[56] References Cited

U.S. PATENT DOCUMENTS

| | | | |
|---|---|---|---|
| Re. 34,489 | 12/1993 | Hansma et al. ...................... | 250/306 X |
| 4,724,318 | 2/1988 | Binnig . | |
| 4,935,634 | 6/1990 | Hansma et al. ...................... | 250/306 X |
| 5,294,804 | 3/1994 | Kajimura ............................ | 250/306 X |
| 5,406,833 | 4/1995 | Yamamoto ................................. | 73/105 |
| 5,408,094 | 4/1995 | Kajimura ............................ | 250/306 X |
| 5,463,897 | 11/1995 | Prater et al. . | |
| 5,467,642 | 11/1995 | Hosaka et al. ............................. | 73/105 |
| 5,560,244 | 10/1996 | Prater et al. . | |
| 5,811,802 | 9/1998 | Gamble .................................... | 250/306 |
| 5,825,020 | 10/1998 | Hansma et al. ........................ | 73/105 X |
| 5,831,181 | 11/1998 | Majumdar et al. .................... | 73/105 X |
| 5,847,383 | 12/1998 | Tong ....................................... | 73/105 X |

FOREIGN PATENT DOCUMENTS

| | | |
|---|---|---|
| 62-130302 | 6/1987 | Japan . |
| 9-89910 | 4/1997 | Japan . |

*Primary Examiner*—Daniel S. Larkin
*Attorney, Agent, or Firm*—Frishauf, Holtz, Goodman, Langer & Chick, P.C.

[57] ABSTRACT

A scanning probe microscope including a scanner having a moving end movable in three-dimensional directions, a cantilever removably attached to the moving end, a displacement sensor including a light emitting element capable of applying a light beam to the cantilever and a light receiving element capable of receiving reflected light from the cantilever, and a position adjusting mechanism capable of adjusting the position of the displacement sensor so that the light beam from the light emitting element can always be applied at a constant angle of incidence to a constant position on the cantilever while the moving end of the scanner is being moved. The position adjusting mechanism includes a stationary system having a guide surface in a specific shape, a movable system movable along the guide surface in a manner such that the movable system supports the displacement sensor, and a drive system for causing the movable system to move along the guide surface, thereby translating and rotating the displacement sensor for given distances in given directions.

17 Claims, 7 Drawing Sheets

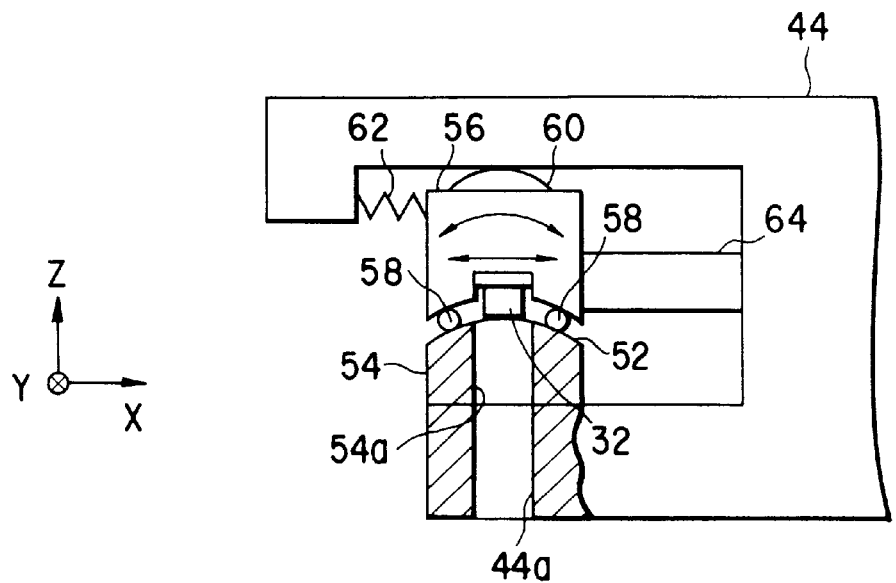
F I G. 7A
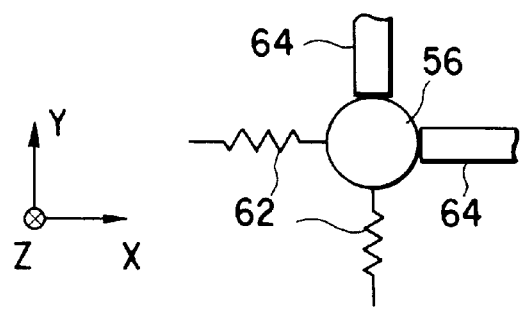
F I G. 7B

CANTILEVER TRACKING TYPE SCANNING PROBE MICROSCOPE

BACKGROUND OF THE INVENTION

The present invention relates to a scanning probe microscope for measuring surface information on a sample with an atomic-order resolution for example.

Conventionally, a scanning tunneling microscope (STM) has been contrived as an example of a scanning probe microscope (SPM) by Binnig, Rohrer, et al. However, the STM can be used to observe electrically conductive samples only. Accordingly, there has been proposed an atomic force microscope (AFM, see Jpn. Pat. Appln. KOKAI Publication No. 62-130302) as an apparatus that utilizes the element techniques of the STM, including the servo technique, for the observation of insulating samples with an atomic-order resolution.

The AFM, which is regarded as an example of the SPM, comprises a cantilever 4, a scanner ( e.g., a tube-type piezoelectric-scanner) 8, and a displacement sensor 10, as shown in FIG. 9, for example. The cantilever 4 has a pointed probe 2 on its free end. The scanner 8 supports the cantilever 4 and causes the probe 2 and a sample 6 to move relatively to each other. The displacement sensor 10 can, for example, optically detect deflection of the free end of the cantilever 4.

The cantilever 4, having its proximal end portion supported on a mount 12, is removably attached to a moving end of the scanner 8. The scanner 8 has its proximal end portion mounted on a specific base 14. The displacement sensor 10 contains therein an optical system, such as a laser oscillator or photosensor, and is attached to the moving end of the scanner 8 (first prior art).

When the probe 2 is brought close to the sample 6 placed on a stage 16, in this arrangement of the first prior art, the free end of the cantilever 4 is displaced by interactions (e.g., atomic force, contact force, viscosity, frictional force, magnetic force, etc.) between the tip of the probe 2 and the surface of the sample 6. Surface information (e.g., irregularity information) on the sample 6 or the like is measured three-dimensionally by relatively scanning the sample surface in the X- and Y-directions with the probe 2 while optically detecting the displacement of the free end (or feedback-controlling the scanner 8 in the Z-direction to keep the displacement of the free end constant).

Scanning probe microscopes having a scanner with improved scanning response are described in U.S. Pat. Nos. 5,463,897 and 5,560,244, for example.

Each of these scanning probe microscopes comprises a laser oscillator 18, a lens 20, and a photosensor (e.g., four-division photodiode) 22, as shown in FIG. 10A, for example. The laser oscillator 18 can deliver a specific laser beam into the scanner 8 through an aperture 14a that is formed in the base 14. The lens 20 can converge the incident laser beam, delivered from the oscillator 18 into the scanner 8, on the cantilever 4 (more specifically, on the back surface of the cantilever 4 opposite from that surface to which the probe 2 is attached). The photosensor 22 can receive reflected light from the back surface of the cantilever 4 when the laser beam is converged thereon.

The lens 20 is positioned and fixed to a mounting frame 24 in the scanner 8 so that the laser beam from the laser oscillator can be incident on the center of the lens 20. The photosensor 22 is supported on a support member 26 that is attached to the base 14. It can be moved parallel to its light receiving surface 22a (second prior art).

For other constructions, the second prior art resembles the first one. In the description to follow, therefore, like reference numerals are used to designate like portions, and a description of those portions is omitted.

In this arrangement of the second prior art, the laser beam emitted from the laser oscillator 18 is converged on the back surface of the cantilever 4 by the lens 20 after it is applied to the lens 20 through the aperture 14a in the base 14.

As this is done, the reflected light from the back surface of the cantilever 4 is applied to the photosensor (e.g., four-division photodiode) 22, and is converted into specific electrical signals (more specifically, electrical signals with intensities corresponding to the quantities of received light and/or the positions of light reception).

If the moving end of the scanner 8 is moved in the X- or Y-direction (e.g., in the X-direction) in this state, the cantilever 4 moves for substantially the same distance in the X-direction as the movement of the moving end. The attachment position of the lens 20 is adjusted in consideration of the focal distance so that the laser beam can be converged on the back surface of the cantilever 4 during X- and Y-direction scanning.

According to the first prior art, however, the cantilever 4, displacement sensor 10, and mount 12 are attached to the moving end of the scanner 8. Accordingly, the mass that acts on the moving end of the scanner 8 increases, so that the kinetic mass of the moving end increases. Thus, the resonance frequency of the scanner 8 is lowered, so that the scanning response for the X-, Y-, and Z-directions is lowered inevitably.

In measuring surface information on the sample 6 (e.g., semiconductor circuit pattern) that has a sharp stepped portion 6a, such as the one shown in FIG. 10B, for example, by means of the scanner 8 with low scanning response (or having a moving end with substantial kinetic mass), the displacement motion of the scanner 8 in the Z-direction cannot catch up with the scanning operation if the scanning speed for the X- and Y-directions is increased. Thus, it is difficult accurately to measure the surface information on the sample 6.

Further, the displacement sensor 10 is fitted with an adjusting knob for adjusting the relative positions of the aforesaid optical system and the cantilever 4, and the scanner 8 is subjected to a bending moment by means of an operating force that is applied to the displacement sensor 10 as the knob is manipulated. In general, the scanner 8 is formed of a thin ceramic material and is bonded to the base 14 with a specific adhesive agent. If the scanner 8 is subjected to the bending moment, therefore, it may be damaged or separated from the base 14, in some cases.

Although the second prior art is an improved technique that has been developed to solve the aforesaid problem of the first prior art, it is based on the sacrifice of some other technical effects of the first prior art.

Now let it be supposed that the moving end of the scanner 8 is displaced without any interaction between the sample 6 and the probe 2 (i.e., with the cantilever 4 kept distant enough from the sample 6).

According to the first prior art, the relative positions of the optical system of the displacement sensor 10 and the cantilever 4 are kept fixed without being influenced by the state of displacement of the moving end of the scanner 8, so that the position and angle of incidence of the laser beam on the cantilever 4 never change. In consequence, the position of application of the reflected light from the cantilever 4 to the photosensor 22 can be also kept constant. Thus, the electrical signals delivered from the displacement sensor 10 are always kept constant and never change.

According to the second prior art, on the other hand, if the moving end of the scanner 8 is displaced, the angle and/or position of incidence of the laser beam on the cantilever 4 changes depending on the state of displacement of the moving end.

In the case where the angle of incidence of the laser beam on the cantilever 4 changes, the position of application of the reflected light from the cantilever 4 to the photosensor 22 also changes. In consequence, the electrical signals delivered from the photosensor 22 have an output characteristic Z such that the free end of the cantilever 4 is displaced apparently by interactions between the irregular surface of the sample 6 and the probe 2, as compared with a displacement d of the moving end of the scanner 8, as shown in FIG. 10C.

In the case where the position of incidence of the laser beam on the cantilever 4 changes, on the other hand, the laser beam partially projects from the cantilever 4, so that the position of application of the reflected light to the photosensor 22 changes, and therefore, the light intensity distribution on the light receiving surface 22a changes. In consequence, the electrical signals delivered from the photosensor 22 have an output characteristic Z such that the free end of the cantilever 4 is displaced apparently by interactions between the irregular surface of the sample 6 and the probe 2, as compared with a displacement d of the moving end of the scanner 8, as shown in FIG. 10C.

If the surface information on the sample 6 is actually measured by the second prior art method, therefore, the electrical signals corresponding to the output characteristic Z are superposed as noise signals on the actual surface information (irregularity information) on the sample 6, so that it is difficult to measure the surface information accurately. The resulting surface information signal is not the simple sum of error signals that are produced when the free end of the cantilever 4 is distant enough from the sample 6. More specifically, the surface information signal is a function of the irregularity information on the sample 6 and the error signals.

BRIEF SUMMARY OF THE INVENTION

The object of the present invention is to provide a scanning probe microscope with high scanning response, capable of obtaining accurate measurement information at all times.

In order to achieve the above object, a scanning probe microscope according to the present invention comprises a scanner having a moving end movable in three-dimensional directions, a cantilever removably attached to the moving end of the scanner, a displacement sensor including a light emitting element capable of applying a light beam to the cantilever and a light receiving element capable of receiving reflected light from the cantilever, whereby the displacement of the cantilever is detected optically, and a position adjusting mechanism capable of adjusting the position of the displacement sensor so that the light beam emitted from the light emitting element can be applied at a constant angle of incidence to a constant position on the cantilever while the moving end of the scanner is being moved.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments give below, serve to explain the principles of the invention.

FIG. 7A is a view showing an arrangement of a position adjusting mechanism attached to the scanning probe microscope shown in FIG. 6;

FIG. 7B is a view showing the relative positions of compression springs and actuators arranged in the position adjusting mechanism shown in FIG. 7A;

DETAILED DESCRIPTION OF THE INVENTION

A scanning probe microscope according to a first embodiment of the present invention will now be described with reference to the accompanying drawings of FIGS. 1A, 1B, 1C, 2A, 2B, and 3.

Figure 1A:
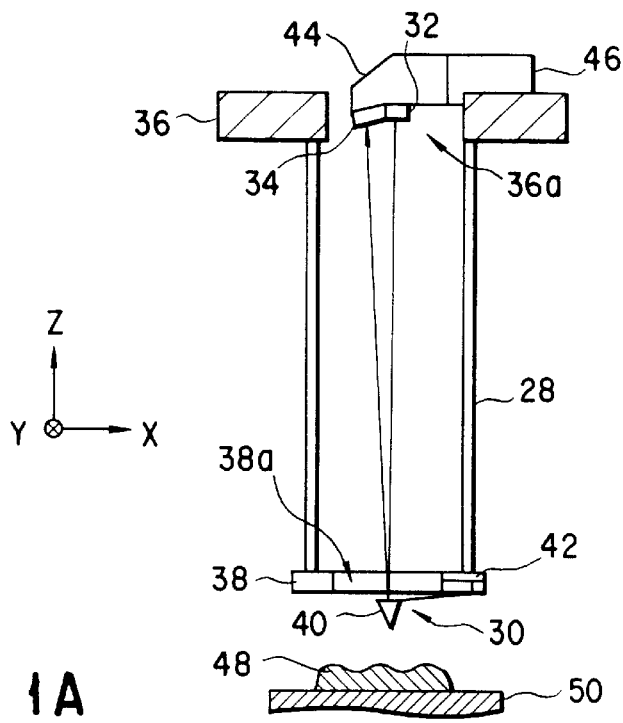
FIG. 1A is a view schematically showing an arrangement of a scanning probe microscope according to a first embodiment of the present invention.

As shown in FIG. 1A, the scanning probe microscope according to the present embodiment comprises a scanner 28, a cantilever 30, a displacement sensor, and a position adjusting mechanism. The scanner 28 has a moving end that is movable in three-dimensional directions (X-, Y-, and Z-directions) when supplied with specific electrical signals. The cantilever 30 is removably attached to the moving end of the scanner 28. The displacement sensor includes a light emitting element 32 and a light receiving element 34. The emitting element 32 can apply a light beam to the cantilever 30, while the receiving element 34 can receive reflected light from the cantilever 30. The position adjusting mechanism can adjust the position of the displacement sensor so that the light beam emitted from the light emitting element 32 can always be applied at a constant angle of incidence to a constant position on the cantilever 30 while the moving end of the scanner 28 is being moved.

The scanner 28 has its stationary end fixed to a microscope base 36. For example, a hollow-tube piezoelectric scanner may be used as the scanner 28. A ring 38 is mounted on the moving end of the scanner 28. It has an aperture (hereinafter referred to as "ring aperture") 38a that is concentric with the center line of the scanner 28. The ring 38 may be in any other shape than the shape of a concentric circle.

The scanner 28 may suitably be formed of three piezoelectric elements that are arranged individually in the directions of three orthogonal axes (X-, Y-, and Z-axis directions) so that it can extend and contract in one direction in response to applied voltage. Since this structure is a conventional actuator of the tripod type, a detailed description of its arrangement is omitted herein.

The tripod-type actuator has a problem that the three rod-shaped piezoelectric elements interfere with one another as they extend and contract. This problem may be solved by the arrangement of a probe scanning mechanism described in Jpn. Pat. Appln. KOKAI Publication No. 9-89910, for example. This mechanism is an improved version of the tripod-type actuator, and its improvement lies that three piezoelectric elements, which are arranged individually in the directions of three orthogonal axes (X-, Y-, and Z-axis directions) so that it can extend and contract in one direction in response to applied voltage, have no contacts and are designed to press a moving elements that holds a cantilever. Unlike the tripod type, therefore, the probe scanning mechanism allows the three piezoelectric elements to extend and contract independently of one another.

The following is a detailed description of a case where a tube-type piezoelectric scanner is used as the scanner 28 according to the present embodiment.

The cantilever 30 has a pointed probe 40 on its free end. It can be removably attached to the ring 38 by means of a mount 42, which is fixed to the proximal end of the cantilever 30. Preferably, the cantilever 30 is attached to the ring 38 so that its free end is situated in the ring aperture 38a (e.g., in the center of the aperture 38a on the center line of the scanner 28).

The displacement sensor is located in a sensor holder 44 that has the position adjusting mechanism built in. The sensor can be translated and rotated for given distances in given directions by means of the adjusting mechanism. The holder 44 is mounted on the microscope base 36 by means of a mounting member 46. The member 46 is designed to move the holder 44 in two-dimensional directions along the base 36. At the time of initialization before measurement, for example, position adjustment can be carried out for the application of the light from the light emitting element 32 to a desired position on the back surface of the cantilever 30.

The light emitting element 32 of the displacement sensor is designed so that it can apply a measurement light beam, such as a monochromatic light beam or laser beam, to the back surface of the cantilever 30 (surface opposite from the surface to which the probe 40 is attached) through the ring aperture 38a.

The light receiving element 34 of the displacement sensor may be formed of a four-division photodiode, for example. The reflected light from the back surface of the cantilever 30 can be received by light receiving surfaces of this photodiode and converted into electrical signals that correspond to the quantities of received light and/or the positions of light reception on the individual light receiving surfaces.

The microscope base 36 is provided with an aperture (hereinafter referred to as "base aperture") 36a that is concentric with the center line of the scanner 28. The displacement sensor can be situated in a predetermined position in the base aperture 36a by moving the mounting member 46 to adjust the position of the sensor holder 44. The aperture 36a may be in any other shape than the shape of a concentric circle.

Two methods of measurement, the DC (direct contact) mode measurement method and AC (alternative contact) mode measurement method, are applicable to the scanning probe microscope according to the present embodiment. In the DC mode method, surface information on a sample 48 is measured by scanning the sample 48 in the X- and Y-directions with the probe 40 without exciting the cantilever 30 while keeping the state of deflection of the cantilever 30 constant as the probe contact pressure is set. In the AC mode method, the surface information on the sample 48 is measured by scanning the sample 48 in the X- and Y-directions with the probe 40 in a manner such that the cantilever 30 is excited at a given resonance frequency. In the description to follow, the DC and AC mode measurement methods will be referred to generically or simply as the SPM measurement method.

The SPM measurement method includes the following two methods for detecting the surface information on the sample.

(1) A method in which the distance between the sample 48 and the cantilever 30 is controlled so as to keep the displacement or the amplitude of vibration of the free end portion of the cantilever 30 fixed, and the surface information on the sample 48 (e.g., irregularity information on the sample surface) is detected in accordance with the resulting control signal.

(2) A method in which the distance between the sample 48 and the cantilever 30 is kept at a given initial value, and the surface information on the sample 48 (e.g., irregularity information on the sample surface) is detected in accordance with the resulting variation of the displacement or the amplitude of vibration of the free end portion of the cantilever 30.

Further, the microscope according to the present embodiment may be a scanning probe microscope of the probe-scanning type in which the surface information of the sample 48 fixed on a stage 50 is subjected to SPM measurement by moving the probe 40 in the X- and Y-directions with respect to the sample 48.

This scanning probe microscope is provided with a control circuit (e.g., feedback control circuit, not shown), which serves to apply a specific electrical signal (e.g., voltage signal) to the scanner 28 so that the distance between the tip of the probe 40 and the surface of the sample 48 (or the state of deflection of the cantilever 30) can be kept constant in response to the signal from the light receiving element 34 during the SPM measurement.

The position adjusting mechanism according to the present embodiment is constructed so that the displacement sensor can be translated and rotated for the given distances in the given directions, whereby the measurement light beam emitted from the light emitting element 32 is always applied at a constant angle of incidence to one and the same position on the back surface of the cantilever 30 during the aforesaid SPM measurement.

Figure 1B:
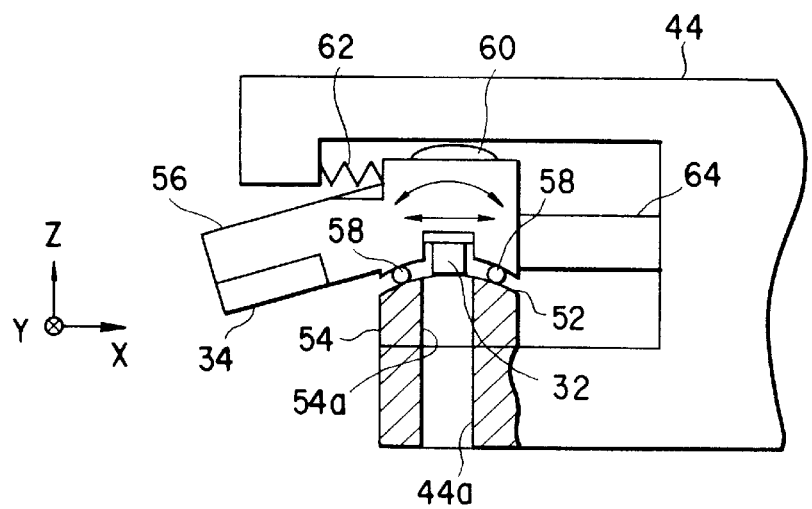
FIG. 1B is a view showing an arrangement of a position adjusting mechanism attached to the scanning probe microscope shown in FIG. 1A.

FIG. 1B shows an arrangement of the position adjusting mechanism in the sensor holder 44. The adjusting mechanism comprises a stationary system having a guide surface 52 in a specific shape, a movable system, and a drive system. The movable system can move along the guide surface 52 of the stationary system in a manner such that it supports the displacement sensor. The drive system causes the movable system to move along the guide surface of the stationary system, whereby the displacement sensor can be translated and rotated for the given distances in the given directions.

The stationary system includes a stationary element 54 in the form of a hollow ring fixed to the sensor holder 44. The element 54 is formed having the guide surface 52 having a shape that is defined by a function (mentioned later) and its correction. Further, the stationary element 54 has an aperture 54a through which the measurement light beam emitted from the light emitting element 32 is passed. On the other hand, the sensor holder 44 is formed having a hole portion 44a that connects with the aperture 54a.

The movable system includes a movable element 56 and a plurality of spheres 58. The movable element 56 is fitted with the light emitting element 32 and the light receiving element 34 of the displacement sensor. The spheres 58 are rotatably interposed between the movable element 56 and the guide surface 52 of the stationary element 54 so that the movable element 56 can be translated and rotated in the directions of the arrows in FIG. 1B along the guide surface 52 of the stationary element 54. According to the present embodiment, three spheres 58 are interposed between the movable element 56 and the guide surface 52 of the stationary element 54 by way of example.

The movable element 56 is provided with an attachment adjusting mechanism for adjusting the attachment positions of the light emitting and receiving elements 32 and 34 so that the reflected light from the back surface of the cantilever 30 can be received when the measurement light beam is applied to the back surface of the cantilever 30 (see FIG. 1A). More specifically, according to the present embodiment, the light receiving element 34 can be moved in two-dimensional directions within an attachment plane for its attachment position.

Normally, moreover, the movable element 56 is pressed toward the guide surface 52 of the stationary element 54 by means of a Z-direction push member (e.g., push spring 60) that is attached to the sensor holder 44.

Further, a plurality of XY-direction push members (e.g., compression springs 62) are arranged between the movable element 56 and sensor holder 44. When the movable element 56 is at a standstill, the springs 62 can keep the element 56 in a constant attitude and position. According to the present embodiment, as shown in FIG. 1C, for example, two compression springs 62 are arranged at right angles to each other in the X- and Y-directions.

If the movable element 56 in this state is translated and rotated by means of external forces from the drive system (mentioned later), its position and attitude can be maintained by means of the compression springs 62.

The drive system includes a plurality of actuators (e.g., piezoelectric scanners formed of piezoelectric elements) 64 that are interposed between the sensor holder 44 and the movable element 56. Thus, the movable element 56 can be translated and rotated along the guide surface 52 of the stationary element 54 by driving the actuators 64 in response to the electrical signal (e.g., voltage) applied to the scanner 28 during the SPM measurement.

Figure 1C:
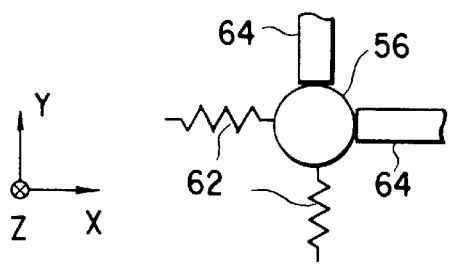
FIG. 1C is a view showing the relative positions of compression springs and actuators arranged in the position adjusting mechanism shown in FIG. 1B.

According to the present embodiment, as shown in FIG. 1C, for example, two actuators 64 are arranged at right angles to each other in the X- and Y-directions. The movable element 56 can be translated and rotated along the guide surface 52 of the stationary element 54 by suitably extending or contracting the actuators 64 in response to the electrical signal (e.g., voltage) applied to the scanner 28.

The following is a description of a functional expression for settling the shape of the guide surface 52 of the stationary element 54.

The shape of the guide surface 52 must be settled in consideration of translational and rotational components of a luminescent point (not shown) of the light emitting element 32 that are moved as the movable element 56 is translated and rotated.

The rotational component of the luminescent point will be described first.

Figure 2A:
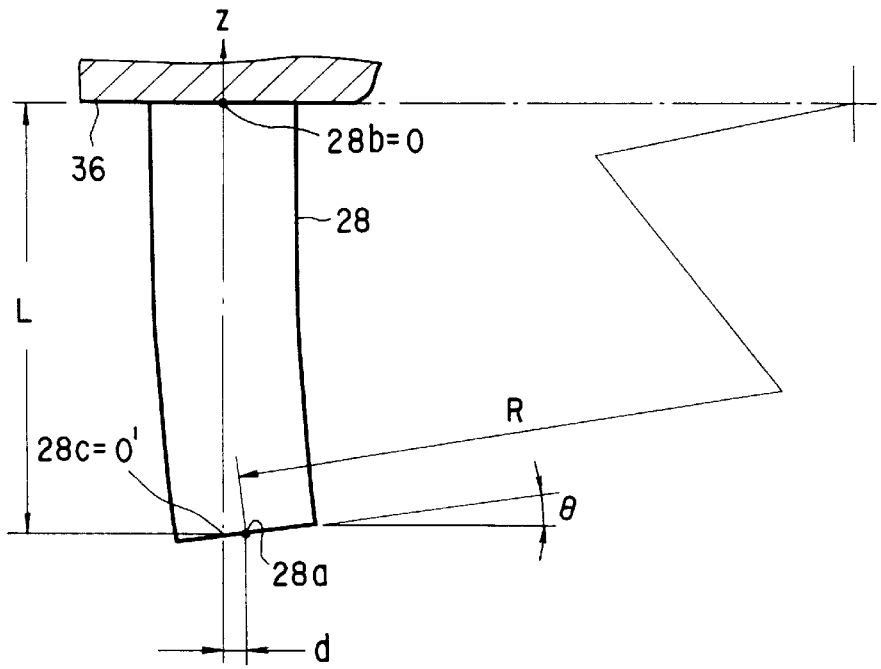
FIG. 2A is a diagram showing the relation between the displacement and angle change of a moving end of a scanner.

As shown in FIG. 2A, the displacement values in the X- and Y-directions of a center 28a of the moving end of the scanner 28, the angular variation, the length of the scanner 28, and the curvature of the center 28a of the moving end of the scanner 28 obtained when a certain voltage is applied are d, θ, L, and R, respectively. In this case, the displacement values d and the angular variation θ are related as follows:

$$d = R(1-\cos\theta) = 2R\sin^2(\theta/2). \tag{1}$$

The scanner length L is given by $$L = R \cdot \theta \tag{2}$$

so that we obtain $$d = (2L/\theta)\sin^2(\theta/2). \tag{3}$$

If θ<<1 is given, we obtain $$d \approx (2L/\theta) \cdot (\theta/2)^2 = L \cdot \theta/2. \tag{4}$$

Therefore, we obtain $$\theta \approx 2d/L \tag{5}$$

Figure 3:
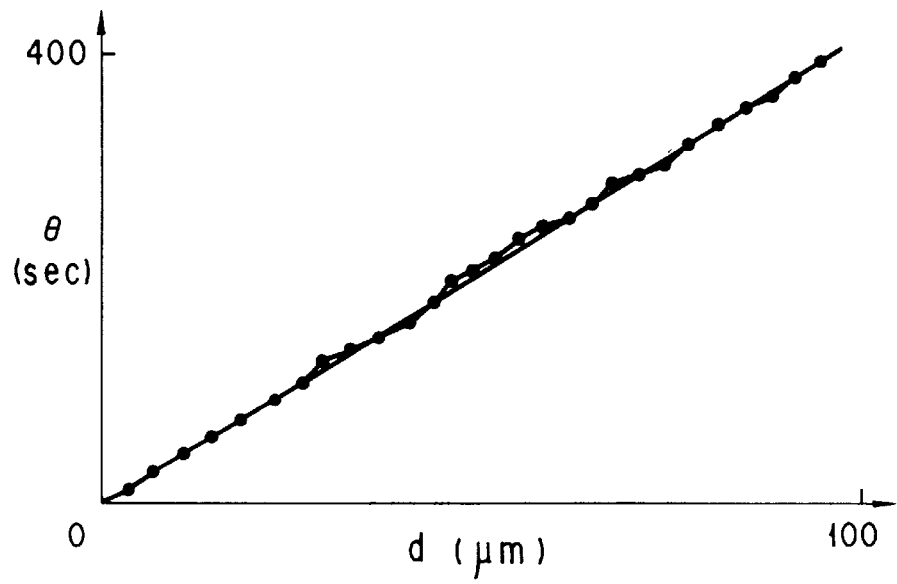
FIG. 3 is a diagram showing the relation between the angle of application of a measurement light beam to the back surface of a cantilever and the displacement of the moving end of the scanner.

(see actual measurement data of FIG. 3).

As seen from these data, the angle of application of measurement light to the back surface of the cantilever 30 is proportional to the displacement of the moving end of the scanner 28.

Actually, the displacement of the luminescent point in the azimuthal direction is two-dimensional (in the X- and Y-directions). If displacement values in the X- and Y-directions are dx and dy, respectively, it is necessary only that the luminescent point be declined toward the center 28a of the scanner 28 at the angle θ that is obtained from $$\theta \approx (2/L) \cdot (dx^2 + dy^2)^{1/2}. \tag{6}$$

The following is a description of the translational component of the luminescent point.

Figure 2B:
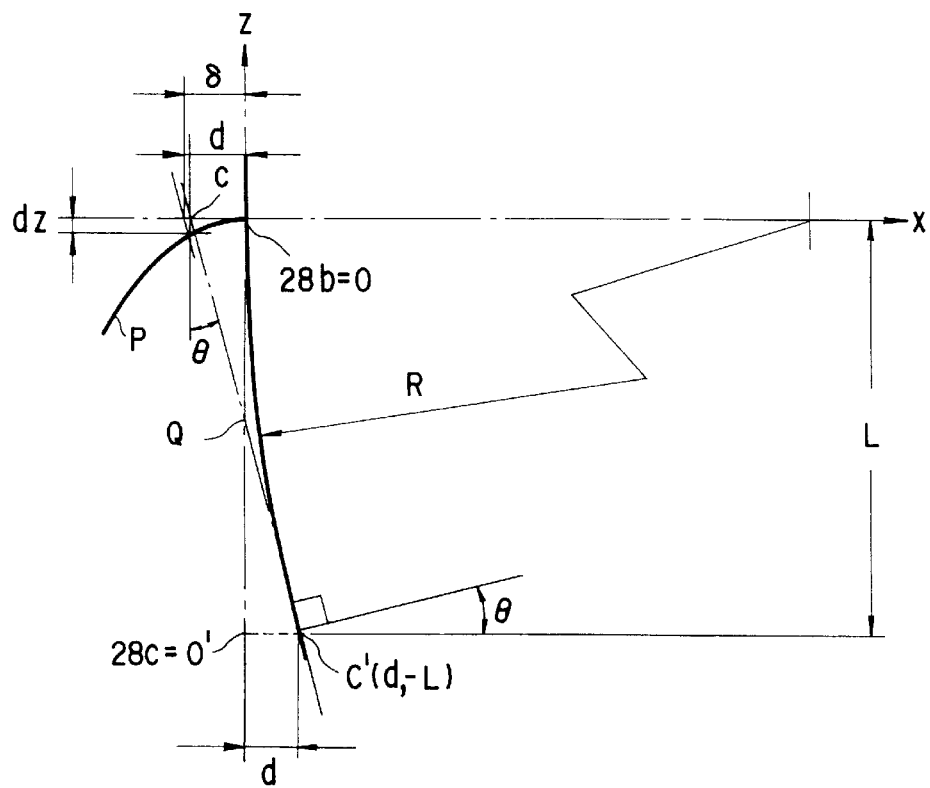
FIG. 2B is a diagram showing the trajectory of a luminescent point of a light emitting element.

In FIG. 2B, a center line OO' for the state in which no electrical signal is applied to the scanner 28 and a center line CC' for the case where the moving end of the scanner 28 is displaced by d cross each other at an intersecting point Q.

The center line CC' is given by $$Z-(-L) \approx -(L/2d) \cdot (X-d). \quad (7)$$

Since X=0 is given, the coordinates for the point Q are expressed as follows:

$$Z \approx -(L/2d). \quad (8)$$

If Z=0 is given, moreover, we obtain $$X \approx -d. \quad (9)$$

Accordingly, the point Q is the median of a segment 28b·28c, that is, the center point of a space that envelops the scanner 28 when no electrical signal is applied to the scanner 28. This center point is referred to as the center of the scanner 28 (center on the surface of the scanner 28 corresponding to L/2) herein. The aforesaid expressions (7) to (9) hold only when d is small.

A displacement δ of the luminescent point in the azimuthal direction has substantially the same value as that of the moving end of the scanner 28 in the opposite direction. A displacement value dz in the Z-direction is obtained.

From expression (5), we obtain $$\theta \approx 2d/L,$$

$$\theta \approx \partial dz/\partial d. \quad (10)$$

Therefore, we have $$\partial dz \approx (2/L) \cdot d\partial d. \quad (11)$$

Since dz=0 is obtained when d=0 is given, we obtain $$dz \approx (1/L) \cdot d^2 = (1/L) \cdot (dx^2 + dy^2). \quad (12)$$

A correction value for d is represented by (δ−d), which is expressed as follows:

$$\delta - d \approx 2d^3/L^2. \quad (13)$$

In this case, it is necessary only that the luminescent point be translated for a distance corresponding to the displacement value (δ−d) obtained from expression (13). It is to be understood, therefore, that the displacement values d (or dx and dy) can be corrected according to a cubic expression.

According to this relation, the measurement light beam can always be applied at the constant angle of incidence to the constant position on the back surface of the cantilever 30 by translating and rotating the luminescent point of the light emitting element 32 for distances that satisfy expressions (6) and (12) or expressions (6) and (13) so that the luminescent point comes into contact with a parabola (see FIG. 2B) that has its vertex on a center 28b of the stationary end of the scanner 28 and centers around the Z-axis.

Thus, the shape of the guide surface 52 of the stationary element 54 should only be settled so that expressions (6) and (12) or expressions (6) and (13) are fulfilled.

According to the position adjusting mechanism constructed in this manner, the measurement light beam emitted from the light emitting element 32 can always be applied at the constant angle of incidence to the same position on the back surface of the cantilever 30 in a manner such that the movable element 56 is translated and rotated for given distances in given directions along the guide surface 52 of the stationary element 54 by suitably extending or contracting the two actuators 64 in response to the specific electrical signal (voltage) applied to the scanner 28 during the SPM measurement.

Thus, the measurement light beam emitted from the light emitting element 32 is applied at the constant angle of incidence to the constant position on the back surface of the cantilever 30 after it is passed through the aperture 54a of the stationary element 54 and the hole portion 44a of the sensor holder 44, as shown in FIG. 1A.

The reflected light from the back surface of the cantilever 30 is received by the light receiving element 34 in an adjusted attachment position, and is converted into an electrical signal corresponding to the change of the quantity of received light that is based on the change of the position of light reception. While the probe 40 is being moved for scanning in the X- and Y-directions along the sample 48, the scanner 28 is feedback-controlled as the position adjusting mechanism is controlled so that the distance between the tip of the probe 40 and the surface of the sample 48 (or the state of deflection of the cantilever 30) can be kept constant in response to the output change of the electrical signal from the light receiving element 34. By doing this, accurate SPM measurement information (irregularity information on the sample 48, etc.) can be obtained without involving noises.

Preferably, in the SPM measurement process according to the present embodiment, characteristic data on the scanner 28 should be measured (or pre-scanned) before actual measurement in consideration of the influences of the hysteresis, creep, etc. of the scanner 28.

In this case, the characteristic data on the scanner 28 is data (hereinafter referred to as pre-scan data) that represents the relation between the electrical signal (voltage) applied to the scanner 28 and the displacement of the moving end of the scanner 28, for example.

It is necessary only that the pre-scan data be stored temporarily in a memory (not shown) of the aforementioned control circuit.

Based on this pre-scan data, the position adjusting mechanism is controlled, that is, the two actuators 64 are suitably extended or contracted, whereby the movable element 56 is translated and rotated for the given distances in the given directions along the guide surface 52 of the stationary element 54. By doing this, the measurement light beam emitted from the light emitting element 32 can be accurately applied at the constant angle of incidence to the constant position on the back surface of the cantilever 30 at all times.

According to the scanning probe microscope of the present embodiment, moreover, the displacement sensor is located on the stationary-end side of the scanner 28, and only the cantilever 30 and the mount 42 are arranged on the moving-end side of the scanner 28. Accordingly, the resonance frequency, and therefore, the scanning response, of the scanner 28 can be improved.

According to the present embodiment, furthermore, the attachment adjusting mechanism for adjusting the attachment positions of the light emitting and receiving elements 32 and 34 are arranged on the stationary-end side of the scanner 28. Therefore, the scanner 28, unlike the conventional one, cannot be loaded with any bending moment. Thus, there is no possibility of the scanner 28 being damaged or separated from the microscope base 36.

It is to be understood that the present invention is not limited to the first embodiment described above, and that various changes and modifications may be effected therein by one skilled in the art without departing from the scope or spirit of the invention.

A scanning probe microscope with high scanning response, an object of the present invention, can be also realized if the light receiving element 34 of the displacement sensor is adjustably attached to the microscope base 36.

In this case, the actuators 64 are controlled so that the light emitting element 32 of the displacement sensor can be rotated around the X- or Y-axis without being translated during the SPM measurement.

In this arrangement, the position and angle of incidence of the light beam on the back surface of the cantilever 30 change symmetrically with respect to the center line of the scanner 28 or the Z-axis.

Thus, according to this arrangement, the scanning response can be improved, and the measurement light beam varies symmetrically with respect to the Z-axis, so that the position adjustment for the light emitting element 32, based on the output of the light receiving element 34, can be carried out with ease.

Figure 4:
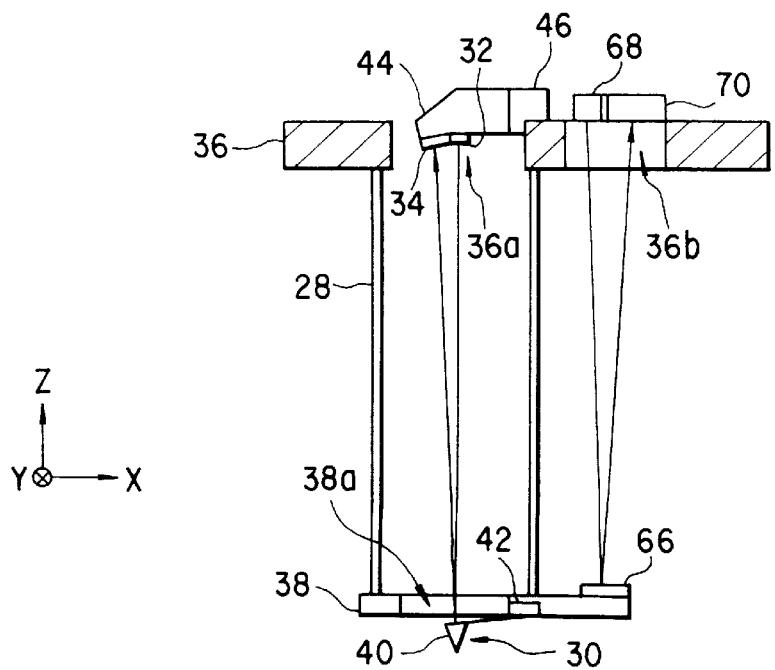
FIG. 4 is a view schematically showing an arrangement of a scanning probe microscope according to a second embodiment of the invention.

Referring now to FIG. 4, a scanning probe microscope according to a second embodiment of the present invention will be described. In the description of the present embodiment to follow, like reference numerals are used to designate like portions with the same constructions throughout the drawings, and a description of those portions is omitted.

In the first embodiment, the position of the displacement sensor is adjusted (translated and rotated) in response to the electrical signal (voltage) applied to the scanner 28. However, the second embodiment is designed so that the position of the displacement sensor can be adjusted in accordance with the displacement (more specifically, angle of inclination θ) of the moving end of the scanner 28.

As shown in FIG. 4, therefore, a position adjusting mechanism according to the present embodiment is further provided with an angle sensor that can directly optically detect the angle of inclination of the moving end of the scanner 28.

The angle sensor includes light reflecting means (e.g., mirror, glass, or deposited metal film) 66 on the ring 38 and an angle sensor system, which is attached to the microscope base 36 in a manner such that its attachment position is adjustable.

The angle sensor system includes a light emitting element 68 and a light receiving element (e.g., four-division photodiode) 70. The light emitting element 68 can apply a specific detection light beam (e.g., monochromatic light beam or laser beam) to the light reflecting means 66. The light receiving element 70 can receive reflected light from the reflecting means 66 and convert it into electrical signals that correspond to the quantities of received light and/or the positions of light reception. The microscope base 36 is formed having an opening 36b through which light is applied to or delivered from the angle sensor system.

In the present embodiment, the angle sensor system is located outside the scanner 28. Alternatively, however, the light reflecting means 66 and the light emitting element 68 may be provided inside the scanner 28.

In this case, the two light sources (light emitting elements 32 and 68) simply exist inside the scanner 28. Thus, according to this arrangement, it is advisable to use light sources with different wavelengths for the sensor system for detecting the displacement of the cantilever 30 and the angle sensor system. Further, detection wavelengths for the light receiving elements 34 and 70 can be changed by means of conventional band-pass filters (not shown), which are located short of the elements 34 and 70 and transmit only light beams with specific wavelengths that match the respective wavelengths of the light sources. Thus, measurement noises attributable to the linkage of the detection light beams can be removed.

It is unnecessary to use special light sources with different wavelengths in the case where the sensor system for detecting the displacement of the cantilever 30 and the angle sensor system are separately located inside and outside the scanner 28. However, the measurement noises can be effectively lowered by using the different-wavelength light sources.

In this arrangement, the detection light beam emitted from the light emitting element 68 is applied to the light reflecting means 66 through the opening 36b. The reflected light from the reflecting means 66 is received by the light receiving element 70 and converted into an electrical signal corresponding to the change of the quantity of received light that is based on the position of light reception.

If the moving end of the scanner 28 is inclined at angles θx and θy in the X- and Y-directions, respectively, during the SPM measurement, the position of incidence of the reflected light on the light receiving element 70 changes.

As this is done, the light reflecting means 66 is translated in the X- and Y-directions. Since the application of the detection light beam is always kept in a fixed direction, however, the position of light reception on the light receiving element 70 varies as the reflecting means 66 moves. Accordingly, the variation of the angle of inclination of the moving end of the scanner 28 can be accurately detected in accordance with the change of the electrical signal delivered from the receiving element 70.

By translating and rotating the displacement sensor by means of the position adjusting mechanism in accordance with the values dx, dy, and dz (see expressions (6) and (9)) that are settled on the basis of the angles of inclination θx and θy detected in this manner, the measurement light beam emitted from the light emitting element 32 can be accurately applied at the fixed angle of incidence to the fixed position on the back surface of the cantilever 30 at all times.

In the SPM measurement process according to the present embodiment, the displacement of the moving end of the scanner 28 is measured directly, so that there is no need of pre-scanning that is required by the arrangement of the first embodiment. In other words, the pre-scanning is unnecessary because the state of displacement of the scanner 28 is detected in a real-time fashion during the SPM measurement. According to the embodiment described above, moreover, an optical sensor is used as the angle sensor. Alternatively, however, an electrostatic capacity sensor or magnetic sensor may be provided near the moving end of the scanner 28, for example.

For other functions and effects, the second embodiment resembles the first embodiment, so that a description of those particulars is omitted.

Figure 5:
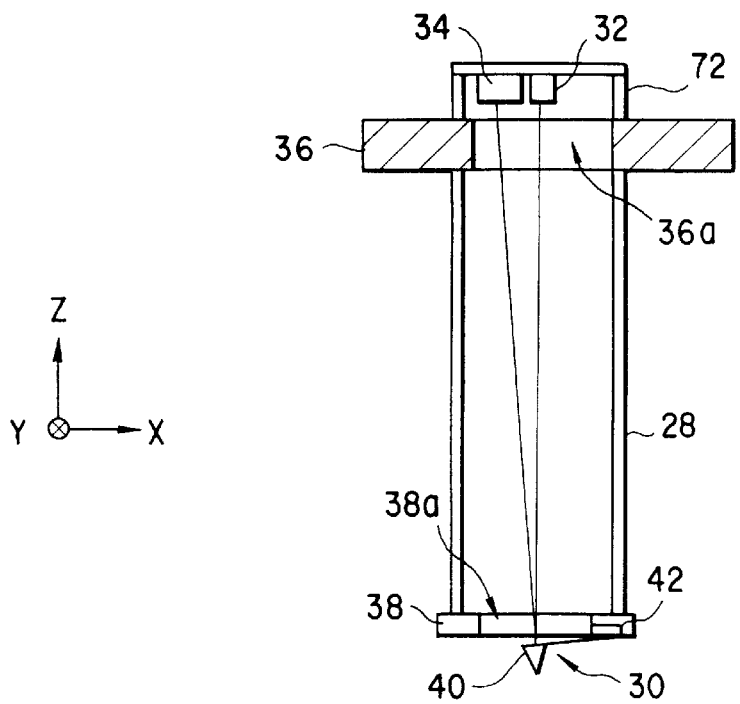
FIG. 5 is a view schematically showing an arrangement of a scanning probe microscope according to a third embodiment of the invention.

Referring now to FIG. 5, a scanning probe microscope according to a third embodiment of the present invention will be described. In the description of the present embodiment to follow, like reference numerals are used to designate like portions with the same constructions throughout the drawings, and a description of those portions is omitted.

As shown in FIG. 5, a position adjusting mechanism according to the present embodiment is provided with a position adjusting scanner (e.g., tube-type piezoelectric scanner) 72 that is mounted on the microscope base 36, and the displacement sensor is attached to a moving end of the scanner 72.

The position adjusting scanner 72 is designed so that its moving end can be displaced for a given distance in a given direction in response to the electrical signal (voltage) applied to the scanner 28.

If the XY-direction displacement of the moving end of the position adjusting scanner 72 and the length of the scanner 72 are $d_2$ and $L_2$, respectively, in this case, expression (5) gives an angle variation $\theta_2$ of the moving end of the position adjusting scanner 72 as follows:

$$\theta_2 \approx 2d_2/L_2. \qquad (14)$$

If $L_2<L$ is given, $d_2$ can be a displacement smaller than d.

If the moving end of the position adjusting scanner 72 is displaced so that $\theta=\theta_2$ is obtained, the respective center lines of the moving ends of the scanners 28 and 72 are deviated from each other by a margin corresponding to the sum of the respective translational components of the moving ends.

In this case, it is necessary only that $\theta_2$ be adjusted to a value smaller than the value obtained from expression (5) or (6) so that the measurement light beam can be applied to the same position on the back surface of the cantilever 30.

Preferably, in the SPM measurement process according to the present embodiment, characteristic data on the scanner 28 and the position adjusting scanner 72 should be measured (or pre-scanned) before actual measurement in consideration of the influences of the hysteresis, creeps, etc. of the scanners 28 and 72.

In this case, the characteristic data on the scanner 28 and the position adjusting scanner 72 are data (hereinafter referred to as pre-scan data) that represent the relations between the electrical signals (voltages) applied to the scanners 28 and 72 and the displacements of the respective moving ends of the scanners 28 and 72, for example.

It is necessary only that the pre-scan data be stored temporarily in the memory (not shown) of the aforementioned control circuit.

Based on these two pre-scan data, the moving end of the position adjusting scanner 72 is displaced for the given distance in the given direction. By doing this, the measurement light beam emitted from the light emitting element 32 can be accurately applied to the same position on the back surface of the cantilever 30 at all times.

According to the present embodiment, the angle of incidence of the measurement light beam applied to the back surface of the cantilever 30 is not kept fixed. However, the displacement sensor is located on the stationary-end side of the scanner 28, and only the cantilever 30 and the mount 42 are arranged on the moving-end side of the scanner 28. Accordingly, the resonance frequency, and therefore, the scanning response, of the scanner 28 can be improved.

It is to be understood that the present invention is not limited to the third embodiment described above, and that various changes and modifications may be effected therein by one skilled in the art without departing from the scope or spirit of the invention.

For example, the scanning probe microscope according to the present embodiment may be additionally furnished with an angle sensor (see FIG. 4) that can directly optically detect the displacement (more specifically, angle of inclination) of the moving end of the scanner 28. According to this arrangement, the position of the displacement sensor can be adjusted in accordance with the angle of inclination of the moving end of the scanner 28.

In this case, the displacement of the moving end of the scanner 28 is measured directly, so that there is no need of pre-scanning that is required by the arrangement of the third embodiment. In other words, the pre-scanning is unnecessary because the state of displacement of the scanner 28 is detected in a real-time fashion during the SPM measurement. According to the embodiment described above, moreover, an optical sensor is used as the angle sensor. Alternatively, however, an electrostatic capacity sensor or magnetic sensor may be provided near the moving end of the scanner 28, for example.

Figure 6:
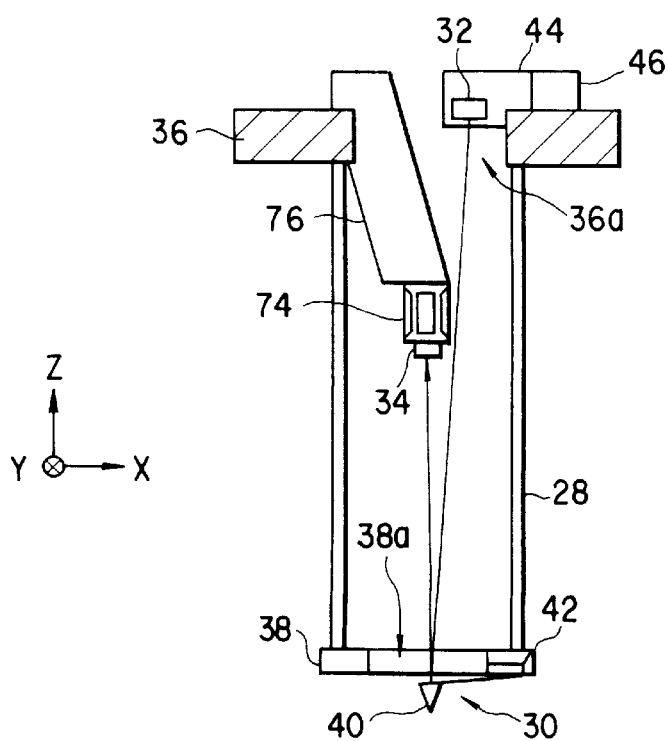
FIG. 6 is a view schematically showing an arrangement of a scanning probe microscope according to a fourth embodiment of the invention.

Referring now to FIGS. 6, 7A, and 7B, a scanning probe microscope according to a fourth embodiment of the present invention will be described. In the description of the present embodiment to follow, like reference numerals are used to designate like portions with the same constructions throughout the drawings, and a description of those portions is omitted.

As shown in FIG. 6, a position adjusting mechanism according to the present embodiment is further provided with a position adjusting unit for adjustably supporting the light receiving element 34 in a predetermined position in the scanner 28.

The position adjusting unit includes a position adjusting scanner (e.g., tube-type scanner) 74, which can be located in the scanner 28, and a position adjusting support member 76 capable of supporting the position adjusting scanner 74 in the scanner 28. The scanner 74 is supported on the microscope base 36 by means of the support member 76.

In the present embodiment, the light receiving element 34 is attached to the moving end of the position adjusting scanner 74, and only the light emitting element 32 is attached to the position adjusting mechanism that is set in the sensor holder 44.

In the position adjusting mechanism set in the sensor holder 44, as shown in FIGS. 7A and 7B, the movable element 56 is cleared of the portion on which the light receiving element 34 is mounted, so that only the light emitting element 32 is supported as it is translated and rotated in the directions of the arrows. For other constructions and functions, the fourth embodiment resembles the first embodiment. In the description to follow, therefore, like reference numerals are used to designate like portions throughout the drawings, and a description of those portions is omitted.

In the present embodiment, moreover, the light receiving element 34 is adjusted in position by means of the position adjusting support member 76 and the position adjusting scanner 74 so that the center (not shown) of its light receiving surface is always situated in a center Q (see FIG. 2B) of the scanner 28 during the SPM measurement. After this position adjustment is carried out, the reflected light from the back surface of the cantilever 30 is always applied to the light receiving surface of the light receiving element 34.

After the position adjusting support member 76 and the position adjusting scanner 74 are set so that the center of the light receiving surface of the light receiving element 34 is substantially coincident with the center Q, for example, voltage is applied to the scanner 74 so that the moving end of the scanner 74 is displaced in the X-, Y-, and Z-directions. By doing this, the center of the light receiving surface of the light receiving element 34 can be aligned with the center Q easily and accurately.

According to the present embodiment, as in the case of the first embodiment, the measurement light beam emitted from the light emitting element 32 can always be applied at the constant angle of incidence to the same position on the back surface of the cantilever 30 in a manner such that the movable element 56 is translated and rotated for the given distances in the given directions along the guide surface 52 of the stationary element 54 by suitably extending or contracting the two actuators 64 in response to the electrical signal (voltage) applied to the scanner 28.

The reflected light from the back surface of the cantilever 30 is applied to the light receiving surface of the light receiving element 34 that is aligned with the center Q, and is converted into an electrical signal corresponding to the change of the quantity of received light and/or the position of light reception. While the probe 40 is being moved for scanning in the X- and Y-directions along the sample, the scanner 28 is feedback-controlled as the position adjusting mechanism is controlled so that the distance between the tip of the probe 40 and the sample surface (or the state of deflection of the cantilever 30) can be kept constant in response to the output change of the electrical signal from the light receiving element 34. By doing this, accurate SPM measurement information (irregularity information on the sample, etc.) can be obtained without involving noises.

When the scanner 28 is displaced in the Z-direction, the position on the light receiving element 34 in which the reflected light from the cantilever 30 is shifted. This shift or deviation can be corrected with the displacement of the position adjusting scanner 74 in the Z-direction or in the X- and Y-directions.

In the case where the deviation is corrected with extension or contraction in the Z-direction, the displacement of the position adjusting scanner 74 is half that of the scanner 28 in the Z-direction. On the other hand, a deviation (dz/L) in the X- and Y-directions is about $10^{-4}$ times as large as the Z-direction displacement of the scanner 28. Accordingly, the deviation need not always be corrected by means of the position adjusting scanner 74. In order to make the SPM measurement more accurate, however, it is advisable to add a correction table to the device configuration of the control circuit.

Preferably, in the SPM measurement process according to the present embodiment, characteristic data on the scanner 28 should be measured (or pre-scanned) before actual measurement in consideration of the influences of the hysteresis, creep, etc. of the scanner 28.

In this case, the characteristic data on the scanner 28 is data (hereinafter referred to as pre-scan data) that represents the relation between the electrical signal (voltage) applied to the scanner 28 and the displacement of the moving end of the scanner 28, for example.

It is necessary only that the pre-scan data be stored temporarily in the memory (not shown) of the aforementioned control circuit.

Based on this pre-scan data, the two actuators 64 are suitably extended or contracted, whereby the movable element 56 is translated and rotated for the given distances in the given directions along the guide surface 52 of the stationary element 54. By doing this, the measurement light beam emitted from the light emitting element 32 can be accurately applied at the constant angle of incidence to the constant position on the back surface of the cantilever 30 at all times.

For other functions and effects, the fourth embodiment resembles the first embodiment, so that a description of those particulars is omitted.

Figure 8:
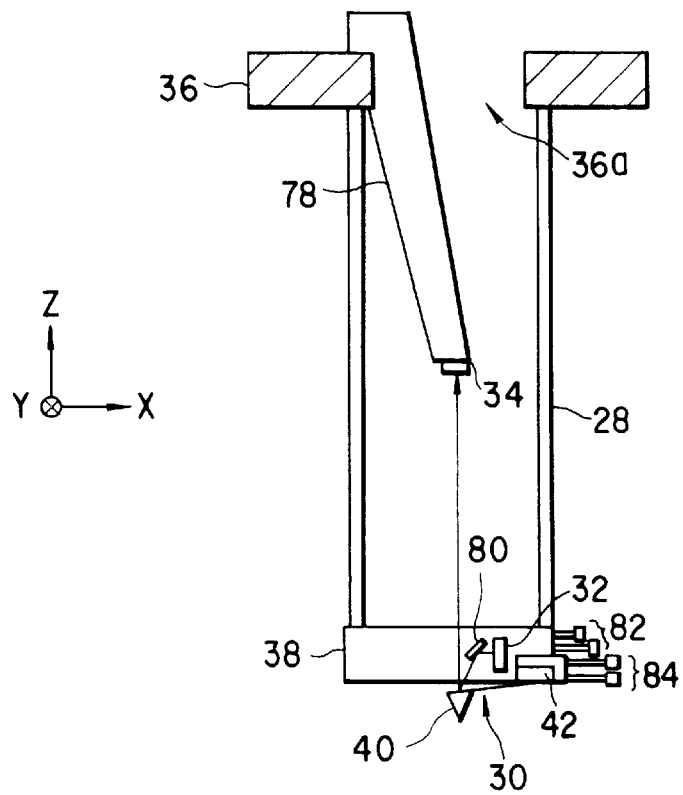
FIG. 8 is a view schematically showing an arrangement of a scanning probe microscope according to a fifth embodiment of the invention.
Figure 9:
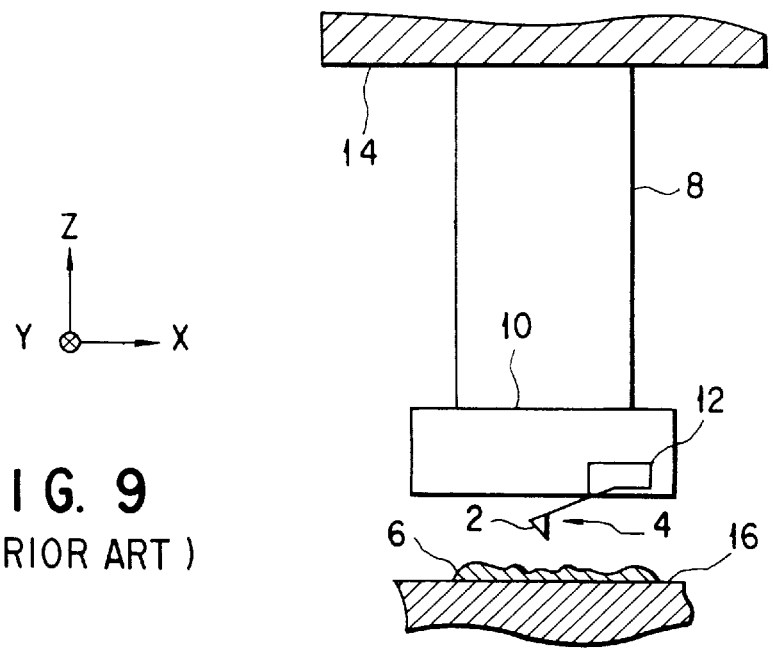
FIG. 9 is a view schematically showing an arrangement of a scanning probe microscope according to a first prior art.
Figure 10A:
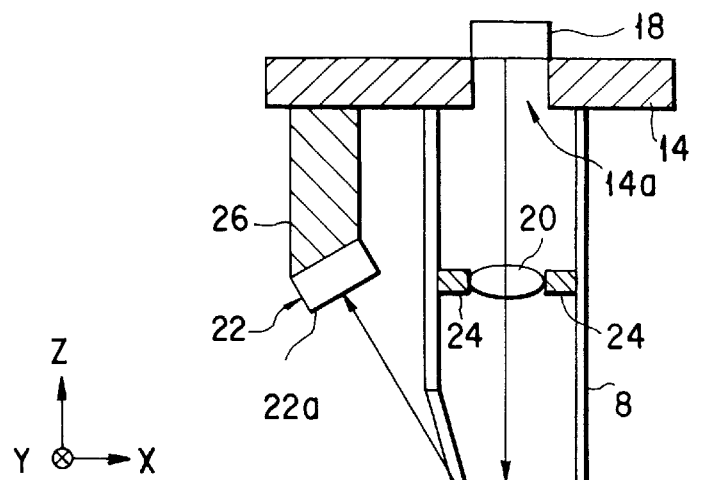
FIG. 10A is a view schematically showing an arrangement of a scanning probe microscope according to a second prior art.
Figure 10B:
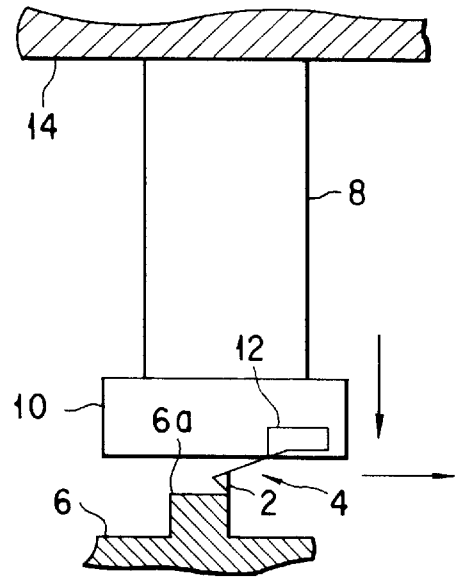
FIG. 10B is a view showing the way surface information on a sample having a sharp stepped portion is measured by means of a first prior art scanning probe microscope.
Figure 10C:
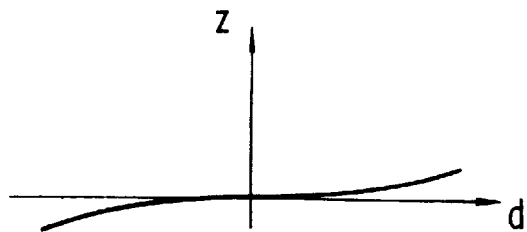
FIG. 10C is a diagram showing the relation between the displacement of a moving end of a scanner and the apparent displacement of a free end of a cantilever, in a second prior art scanning probe microscope.

Referring now to FIG. 8, a scanning probe microscope according to a fifth embodiment of the present invention will be described. In the description of the present embodiment to follow, like reference numerals are used to designate like portions with the same constructions throughout the drawings, and a description of those portions is omitted.

As shown in FIG. 8, a position adjusting mechanism according to the present embodiment is provided with a position adjusting unit for adjusting the position of the light receiving surface of the light receiving element 34 to the center of the scanner 28 and fixing the element 34. In this case, a position adjusting support member 78 is used as the position adjusting unit. The support member 78 is mounted on the microscope base 36. In the present embodiment, the center of the scanner 28 is the median (see FIG. 2B) of the segment 28b·28c that is defined by expressions (7) to (9), that is, the center point of the space that envelops the scanner 28 when no electrical signal is applied to the scanner 28.

According to the present embodiment, moreover, the light receiving element 34 is attached to the distal end of the position adjusting support member 78, while the light emitting element 32 is fixed in the ring 38 that is mounted on the moving end of the scanner 28.

A reflector mirror 80 is located in an optical path between the light emitting element 32 and the back surface of the cantilever 30. During the SPM measurement, the mirror 80 allows the measurement light beam emitted from the light emitting element 32 to be applied at the fixed angle of incidence to the fixed position on the back surface of the cantilever 30. The mirror 80 is not indispensable, and the measurement light beam from the element 32 may be applied directly to the cantilever 30 without being reflected by the mirror 80.

In order to make a fine adjustment of the direction of the measurement light beam (adjustment of the position and angle of incidence of the light beam on the cantilever 30), the reflector mirror 80 may be provided with a rotating shaft (not shown) so that the direction of reflection of the measurement light beam from the light emitting element 32 can be adjusted in accordance with the attachment position of the cantilever 30. This arrangement enables adjustment of a minor error in the direction of reflection of the measurement light beam by the back surface of the cantilever 30 (i.e., in the position of application of the measurement light beam to the light receiving surface of the light receiving element 34) that is attributable to the working or mounting accuracy of the cantilever 30, for example.

Preferably, in this case, the scanning probe microscope should be provided with a light emitting element position adjusting unit having a light emitting element position adjusting knob 82 and a cantilever position adjusting unit having a cantilever position adjusting knob 84, as shown in FIG. 8. Use of these units enables the fine adjustment of the direction of the measurement light beam (adjustment of the position and angle of incidence of the light beam on the cantilever 30). The adjusting knobs 82 and 84 can move the objects of adjustment (cantilever 30 and light emitting element 32) in the direction(s) of one to three axes, depending on the device configuration. Thus, the position of application of the measurement light beam from the light emitting element 32 to the light receiving surface of the light receiving element 34 can be finely adjusted by adjusting the relative positions of the measurement light beam and the cantilever 30.

FIG. 8 shows position adjusting knobs 82, 84 that are used for moving the objects of adjustment in the X and Y directions.

The position adjustment described above can be securely effected by only regulating at least two of the three elements including the rotating shaft of the reflector mirror 80 and the position adjusting knobs 82 and 84. Thus, the device need not always be provided with all the three elements.

In the present embodiment, moreover, the light receiving element 34 is adjusted in position by means of the position adjusting support member 78 so that the center (not shown) of its light receiving surface is always situated in the center Q (see FIG. 2B) of the scanner 28 during the SPM measurement. After this position adjustment is carried out, the reflected light from the back surface of the cantilever 30 is always applied to the light receiving surface of the light receiving element 34.

According to this arrangement, the light emitting element 32 is fixed in the ring 38 that is mounted on the moving end of the scanner 28, so that the relative optical positions of the element 32 and the back surface of the cantilever 30 can be kept constant without being influenced by the state of displacement of the moving end of the scanner 28 during the SPM measurement.

Thus, the measurement light beam emitted from the light emitting element 32 can always be applied at the constant angle of incidence to the constant position on the back surface of the cantilever 30 during the SPM measurement. The reflected light from the back surface of the cantilever 30 is applied to the light receiving surface of the light receiving element 34 that is aligned with the center Q, and is converted into an electrical signal corresponding to the change of the quantity of received light. In consequence, accurate SPM measurement information (irregularity information on the sample, etc.) can be obtained without involving noises.

According to the present embodiment, the scanning probe microscope need not be provided with the complicated position adjusting mechanism that is required in each of the foregoing embodiments. Once the respective positions of the light emitting and receiving elements 32 and 34 are adjusted, moreover, the measurement light beam emitted from the light emitting element 32 can always be applied at the constant angle of incidence to the constant position on the back surface of the cantilever 30 without being influenced by the hysteresis, creep, etc. of the scanner 28 in the SPM measurement in the subsequent stage. Thus, there is no need of pre-scanning that is required by the arrangement of the first embodiment.

In any of the embodiments described herein, the measurement light beam from the light emitting element is applied to the back surface of the cantilever. Alternatively, however, the measurement light beam may be applied to the cantilever in the opposite direction, that is, to that surface of the cantilever on which the probe is provided, with the same effects of the foregoing embodiments and without departing from the scope or spirit of the present invention.

Additional advantages and modifications will readily occurs to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

We claim:

1. A scanning probe microscope comprising:
a scanner having a moving end movable in three-dimensional directions and a stationary end fixed to a base;
a cantilever removably attached to the moving end of the scanner;
a displacement sensor including a light emitting element which applies a light beam to the cantilever and a light receiving element which receives reflected light from the cantilever, whereby the displacement of the cantilever is detected optically; and
a position adjusting mechanism which is attached to the base, and which adjusts the position of the displacement sensor so that the light beam emitted from the light emitting element can be applied at a constant angle of incidence to a constant position on the cantilever while the moving end of the scanner is being moved.

2. A scanning probe microscope according to claim 1, wherein said position adjusting mechanism includes a stationary system having a guide surface in a specific shape, a movable system movable along the guide surface of the stationary system in a manner such that the movable system supports the displacement sensor, and a drive system capable of adjusting the position of the displacement sensor by causing the movable system to move along the guide surface of the stationary system.

3. A scanning probe microscope according to claim 2, wherein said drive system includes a plurality of actuators such that the movable system can be moved along the guide surface of the stationary system by driving the actuators in response to an electrical signal applied to the scanner.

4. A scanning probe microscope according to claim 2, wherein said position adjusting mechanism further includes an additional sensor capable of optically detecting the displacement of the moving end of the scanner, so that the movable system can be moved along the guide surface of the stationary system by driving the drive system in accordance with the displacement of the moving end of the scanner.

5. A scanning probe microscope comprising:
a scanner having a moving end movable in three-dimensional directions;
a cantilever removably attached to the moving end of the scanner;
a displacement sensor including a light emitting element capable of applying a light beam to the cantilever and a light receiving element capable of receiving reflected light from the cantilever, whereby the displacement of the cantilever is detected optically; and
a position adjusting mechanism capable of adjusting the position of the displacement sensor so that the light beam emitted from the light emitting element can be applied to a constant position on the cantilever while the moving end of the scanner is being moved,
the position adjusting mechanism including a position adjusting scan unit having a moving end displaceable for a given distance in a given direction in response to an electrical signal applied to the scanner, the displacement sensor being attached to the moving end of the position adjusting scan unit.

6. A scanning probe microscope comprising:
a scanner having a moving end movable in three-dimensional directions;
a cantilever removably attached to the moving end of the scanner;
a displacement sensor including a light emitting element capable of applying a light beam to the cantilever and a light receiving element capable of receiving reflected light from the cantilever, whereby the displacement of the cantilever is detected optically; and
a position adjusting mechanism capable of adjusting the position of the displacement sensor so that the light beam emitted from the light emitting element can be applied to a constant position on the cantilever while the moving end of the scanner is being moved,
the position adjusting mechanism including an additional sensor capable of optically detecting the displacement of the moving end of the scanner and a position adjusting scan unit having a moving end displaceable for a given distance in a given direction in accordance with the displacement of the moving end of the scanner detected by means of the additional sensor, the displacement sensor being attached to the moving end of the position adjusting scan unit.

7. A scanning probe microscope comprising:

a hollow scanner having a moving end movable in three-dimensional directions;

a cantilever removably attached to the moving end of the scanner;

a displacement sensor including a light emitting element capable of applying a light beam to the cantilever and a light receiving element capable of receiving reflected light from the cantilever, whereby the displacement of the cantilever is detected optically; and a position adjusting mechanism capable of adjusting the position of the displacement sensor so that the light beam emitted from the light emitting element can be applied at a constant angle of incidence to a constant position on the cantilever and the reflected light from the cantilever can always be applied to a light receiving surface of the light receiving element while the moving end of the scanner is being moved, the position adjusting mechanism including a light receiving element position adjusting unit for adjustably supporting the light receiving element in a predetermined position in the scanner and a light emitting element position adjusting unit for adjustably supporting the light emitting element in a predetermined position outside the scanner.

8. A scanning probe microscope according to claim 7, wherein said scanner comprises a hollow tube, and said light receiving element position adjusting unit always situates a center of the light receiving surface of the light receiving element substantially in a center portion of the scanner while the moving end of the scanner is being moved.

9. A scanning probe microscope according to claim 8, wherein said light receiving element position adjusting unit includes a position adjusting scan unit locatable in the scanner and a position adjusting support member capable of supporting the position adjusting scan unit in the scanner.

10. A scanning probe microscope according to claim 7, wherein said light emitting element position adjusting unit includes a stationary system having a guide surface in a specific shape, a movable system movable along the guide surface of the stationary system in a manner such that the movable system supports the displacement sensor, and a drive system capable of adjusting the position of the light emitting element by causing the movable system to move along the guide surface of the stationary system.

11. A scanning probe microscope according to claim 10, wherein said drive system includes a plurality of actuators such that the movable system can be moved along the guide surface of the stationary system by driving the actuators in response to an electrical signal applied to the scanner.

12. A scanning probe microscope comprising:

a scanner having a moving end movable in three-dimensional directions and a stationary end fixed to a base;

a cantilever removably attached to the moving end of the scanner;

a light emitting element which is provided on the moving-end side of the scanner and which applies a light beam at a constant angle of incidence to a constant position on the cantilever;

a light receiving element which receives reflected light from the cantilever; and a light receiving element position adjusting unit which is attached to the base and which adjusts the position of the light receiving element so that the reflected light from the cantilever can always be applied to a light receiving surface of the light receiving element while the moving end of the scanner is being moved.

13. A scanning probe microscope according to claim 12, which further comprises a reflector mirror provided in an optical path between the light emitting element and the cantilever so that the position and the angle of incidence of the light beam applied to the cantilever can be adjusted by regulating the reflector mirror.

14. A scanning probe microscope according to claim 12, wherein said scanner comprises a hollow tube, and said light receiving element position adjusting unit fixes a center of the light receiving surface of the light receiving element substantially in a center portion of the scanner by position adjustment.

15. A scanning probe microscope according to claim 14, wherein said light receiving element position adjusting unit includes a position adjusting support member for supporting the light receiving element, and said light receiving element is fixed by position adjustment so that the center of the light receiving surface of the light receiving element is always situated substantially in the center portion of the scanner.

16. A scanning probe microscope according to claim 12, which further comprises an adjusting mechanism which adjusts respective positions of the light emitting element and the cantilever.

17. A scanning probe microscope according to claim 16, wherein said adjusting mechanism includes a light emitting element position adjusting unit and a cantilever position adjusting unit, each said unit being movable in a direction of at least one axis so that a position of application of the light beam to the cantilever can be adjusted.

* * * * *